United States Patent
Park et al.

(10) Patent No.: US 7,324,800 B2
(45) Date of Patent: Jan. 29, 2008

(54) WAKE-UP SYSTEM WITH PASSIVE CORRELATORS

(75) Inventors: Tah Joon Park, Kyungki-do (KR); Yong Il Kwon, Kyungki-do (KR); Joong Jin Kim, Kyungki-do (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 492 days.

(21) Appl. No.: 11/071,518

(22) Filed: Mar. 3, 2005

(65) Prior Publication Data

US 2006/0116103 A1 Jun. 1, 2006

(30) Foreign Application Priority Data

Nov. 19, 2004 (KR) .................... 10-2004-0095352

(51) Int. Cl.
*H04B 1/16* (2006.01)
*H04B 1/38* (2006.01)
*H04M 1/00* (2006.01)

(52) U.S. Cl. ............. 455/343.2; 455/574; 455/127.5; 455/343.1; 455/343.5

(58) Field of Classification Search ......... 455/343.2, 455/343.1, 343.5, 343.6, 574, 73, 550.1, 455/91, 130, 575.1, 90.3, 572, 127.5, 127.1, 455/343.3; 713/320, 323; 375/150–151, 375/152–153
See application file for complete search history.

(56) References Cited

U.S. PATENT DOCUMENTS

| | | | | |
|---|---|---|---|---|
| 5,784,403 A | * | 7/1998 | Scott | 375/151 |
| 5,953,368 A | * | 9/1999 | Sanderford et al. | 375/141 |
| 6,212,398 B1 | * | 4/2001 | Roberts et al. | 455/502 |
| 6,774,685 B2 | * | 8/2004 | O'Toole et al. | 327/156 |
| 7,050,775 B2 | * | 5/2006 | Mayor et al. | 455/258 |

* cited by examiner

*Primary Examiner*—Pablo N. Tran
(74) *Attorney, Agent, or Firm*—Volpe and Koenig, P.C.

(57) ABSTRACT

Disclosed is a wake-up system with passive correlators, adopted to wireless transmission/reception devices such as remote controllers, mobile communication terminals, etc. The wake-up system includes a transmitter and receiver. In the transmitter wake-up signals and delayed wake-up signals delayed by a predetermined delay time are correlated and coded, respectively, for transmission. In the receiver, signals transmitted from the transmitter and signals delayed by the predetermined delay time are correlated and decoded, respectively. The decoded signals are converted into DC switching voltage VSW for a switching operation of power, thereby performing a wake-up operation. The wake-up system with passive correlators can reduce consumption power for wake-up operations in a receiver such that correlation operations of a correlator including passive electrical elements such as a matched filter, etc. are performed at a transmitter and the receiver in the same fashion and wake-up signals are transformed into a signal for performing the wake-up operation in the receiver.

11 Claims, 9 Drawing Sheets

(a)

(b)

(a)

(b)

(a)

(b)

WAKE-UP SYSTEM WITH PASSIVE CORRELATORS

RELATED APPLICATION

The present application is based on, and claims priority from Korean Application Number 2004-95352, filed Nov. 19, 2004, the disclosure of which is incorporated by reference herein in its entirety.

BACKGROUND OF THE INVENTION

1. Field of the Invention

The present invention relates to a wake-up system adopted to wireless transmission/reception devices such as remote controllers, mobile communication terminals, etc., and more particularly to a wake-up system with passive correlators capable of reducing consumption power for a wake-up operation in a receiver such that correlation operations of a correlator including passive electrical elements such as a matched filter etc. are performed at a transmitter and the receiver in the same fashion and wake-up signals are transformed into signals for performing the wake-up operation in the receiver.

2. Description of the Related Art

Generally, with increase of utility of wireless access communication, a connection network of a type of wired and wireless integrating system is constructed in various fields and thusly there has arisen a demand for a technical standard for low speed, low-priced and low-power wireless communication.

One of low power operating methods is to operate a system in a power saving mode wherein the system in a sleep mode is awakened according to a wake-up signal. In order to perform a wake-up operation according to a wake-up signal, a system should periodically operate and check whether the wake-up signal is received. Also, if the wake-up signal is received, the system should further confirm whether the wake-up signal corresponds to a signal to activate itself.

As such, in order to perform a confirmation operation of the system wake-up, since a plurality of active elements and circuits should be operated, the system consumes a relatively large amount of power, which should be reduced.

With reference to FIG. 1, one of the wake-up systems of a wireless transmission/reception device is described in detail below.

FIG. 1 is a construction view illustrating a wake-up system of a wireless transmission/reception device according to the prior art.

As shown in FIG. 1, the wake-up system includes a transmission controlling unit 10 for controlling wake-up operations of a receiver, a transmission processing unit 20 for generating and transmitting a wake-up signal according to the control of the transmission controlling unit 10, a reception controlling unit 40 for confirming whether its own wake-up signal is received by repeatedly performing conversion operations between a sleep mode and a standby mode, and controlling a wake-up operation of the system if the received wake-up signal is determined to be a signal corresponding to activate itself, and a reception processing unit 30 for receiving and processing a received signal according to the control of the reception controlling unit 40 and providing the processed signal to the reception controlling unit 40.

In a wake-up operation of such a wireless transmission/reception device, when the transmission controlling unit 10 controls transmission of a wake-up signal, the transmission processing unit 20 generates the wake-up signal and transmits it through the air.

Here, when the reception controlling unit 40 is changed from sleep mode to standby mode to control confirmation of a wake-up signal, a signal received by the reception processing unit 30 is amplified, filtered and decoded. After that, it is confirmed whether the received signal corresponds to its own wake-up signal. If the received signal is its own wake-up signal, the reception controlling unit 40 is awakened. Meanwhile if it is not, the reception controlling unit 40 is changed from standby mode to sleep mode.

As such, the wake-up system of the wireless transmission/reception device according to the prior art consumes a relatively large amount of power to be awakened as active elements or circuits such as a mixer or an oscillator must be operated to process received signals based on signal processes such as decoding etc.

SUMMARY OF THE INVENTION

Therefore, the present invention has been made in view of the above problems, and it is an object of the present invention to provide a wake-up system with passive correlators capable of reducing consumption power for a wake-up operation in a receiver such that correlation operations of correlators including passive electrical elements such as a matched filter etc. are performed at a transmitter and the receiver in the same fashion and wake-up signals are transformed into signals for performing the wake-up operation in the receiver.

In accordance with the present invention, the above can be accomplished by the provision of a wake-up system with passive correlators comprising: a) a transmitter, including: a wake-up signal generation unit for generating wake-up signals; a time delay unit for delaying the wake-up signals by a predetermined delay time (Δt) and generating first delayed signals based on a result of the delaying; a first passive correlator for correlating and coding the respective wake-up signals and the respective first delayed signals and synthesizing the coded signals; and a transmission antenna for wirelessly transmitting signals synthesized by the first passive correlator to the air; and b) a receiver, including: a reception antenna for receiving signals transmitted by the transmission antenna; a second passive correlator for delaying the signals received by the reception antenna by a predetermined delay time (Δt), generating second delayed signals based on a result of the delaying, correlating the respective received signals and the respective second delayed signals in the same fashion as the first passive correlator, decoding the correlation result and synthesizing the decoded signals; a signal amplifying unit for amplifying the signals synthesized by the second passive correlator based on a preset gain; an AC/DC converting unit for converting the output signals from the amplifying unit into DC switching voltage; and a switching unit for performing an ON/OFF switching operation according to the DC switching voltage to output a wake-up voltage therefrom to the receiver.

Preferably, the first and second passive correlators may comprise a matched filter formed on a piezoelectric plate.

Preferably, the first passive correlator may include a first SAW input electrode unit for converting the wake-up signals into first SAW signals; a second SAW input electrode unit for converting the first delayed signals into second SAW signals; a first coding electrode unit for correlating and coding the first SAW signals; a second coding electrode unit for correlating and coding the second SAW signals; and a SAW output electrode unit for synthesizing the SAW signals coded by the first coding electrode unit and the SAW signals coded by the second coding electrode unit and converting the result of the synthesizing into electrical signals to be outputted to the transmission antenna.

Preferably, the second passive correlator may include a SAW input electrode unit for converting received signals received by the reception antenna into SAW signals; a first decoding electrode unit for correlating the SAW signals from the SAW input electrode unit in the same fashion as the first coding electrode unit and decoding the correlation result; a second decoding electrode unit for delaying the SAW signals from the SAW signal input electrode unit by a predetermined delay time ($\Delta t$), correlating the delayed SAW signals in the same fashion as the second coding electrode unit and decoding the correlation result; and a SAW output electrode unit for synthesizing the SAW signals decoded by the first decoding electrode unit and the SAW signals decoded by the second decoding electrode units and converting the synthesizing result into electrical signals to be outputted thereto.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
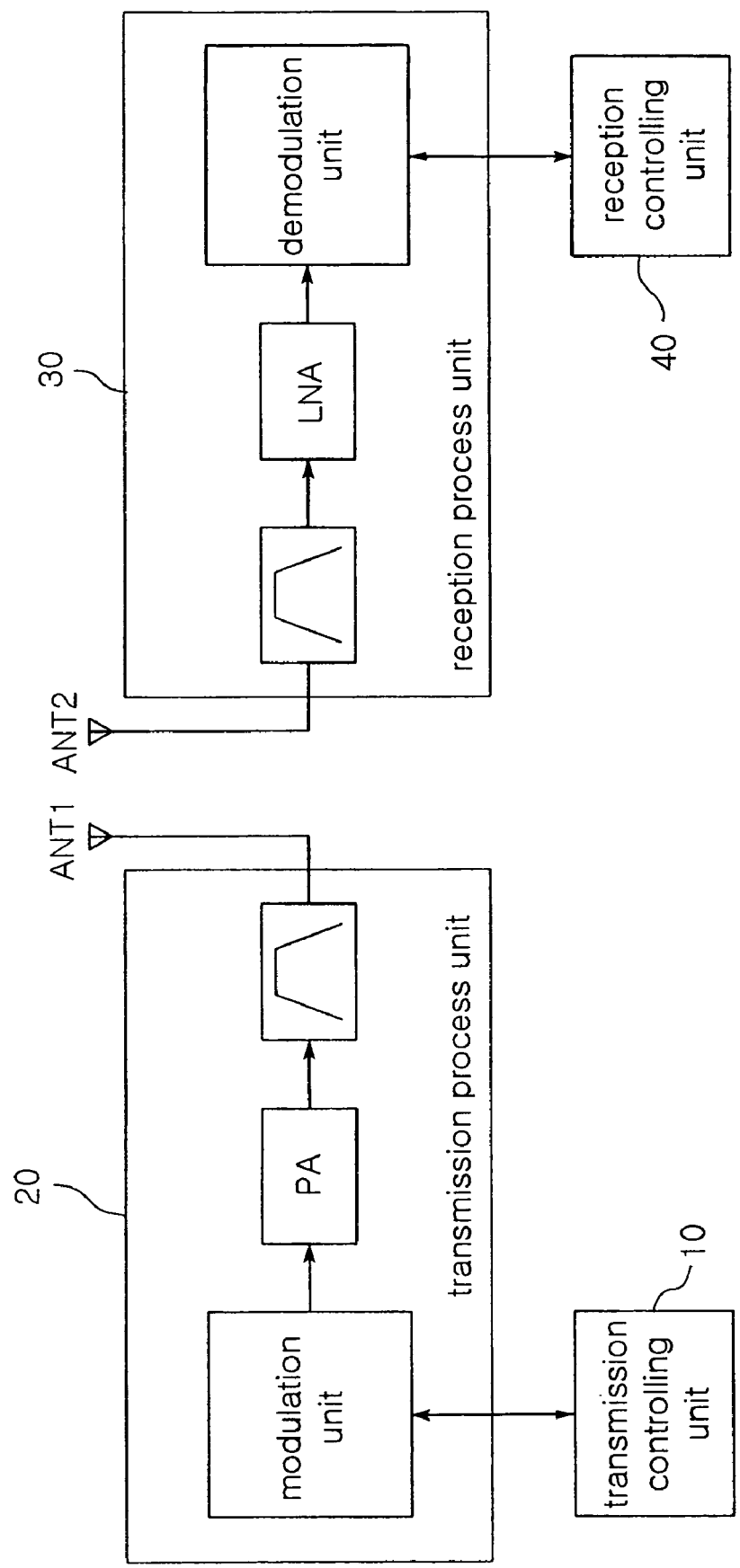
FIG. 1 is a construction view illustrating a wake-up system of a wireless transmission/reception device according to the prior art.

With reference to the attached drawings, the preferred embodiments of the present invention are described in detail below.

In the description, elements having substantially the same configuration and function are denoted by identical reference numerals.

Figure 2:
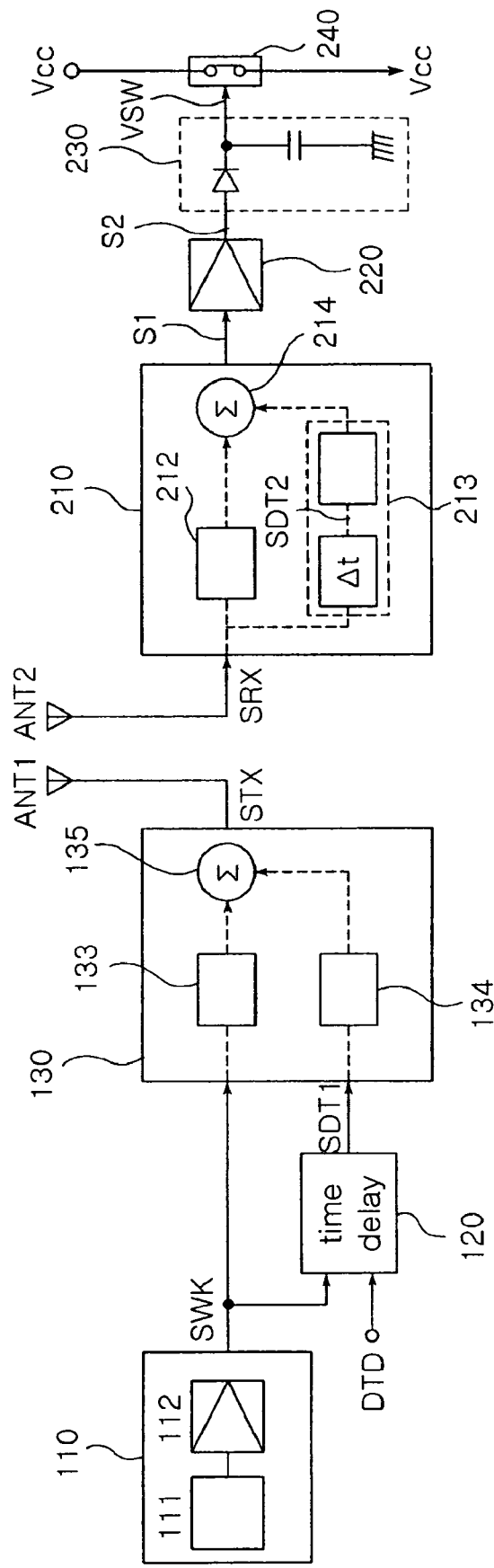
FIG. 2 is a construction view illustrating a wake-up system with passive correlators according to the present invention.

FIG. 2 is a construction view illustrating a wake-up system with passive correlators according to the present invention.

Referring to FIG. 2, the wake-up system includes a transmitter and a receiver. The transmitter includes a wake-up signal generation unit 110 for generating wake-up signals SWK, a time delay unit 120 for delaying the wake-up signals SWK by a predetermined delay time $\Delta t$ and generating first delayed signals STD1 based on a result of the delaying, a first passive correlator 130 for correlating and coding the respective wake-up signals SWK and the respective first delayed signals STD1, and synthesizing the coded signals, and a transmission antenna for wirelessly transmitting the transmitting signals STX coded by the first passive correlator 130 to the air.

The receiver includes a reception antenna ANT2 for receiving signals transmitted by the transmission antenna ANT2, a second passive correlator 210 for delaying the received signals SRX from the reception antenna by a predetermined delay time ($\Delta t$), generating second delayed signals STD2 based on a result of the delaying, correlating the respective received signals SRX and the respective second delayed signals STD2 in the same fashion as the first passive correlator 130, decoding the correlation result and synthesizing the decoded signals, a signal amplifying unit 220 for amplifying the signals synthesized by the second passive correlator 210 based on a preset gain, an AC/DC converting unit 230 for converting the output signals from the amplifying unit 220 into DC switching voltage signals VSW, a switching unit 240 for performing an ON/OFF switching operation according to the DC switching voltage signals VSW and outputting a wake-up voltage to the receiver based on the result of the switching operation.

The wake-up signal generation unit 110 includes a signal generation unit 111 for generating the wake-up signals and a power amplifier 112 for amplifying power of the wake-up signals from the signal generation unit for transmission. The time delay unit 120 is designed such that the predetermined delay time $\Delta t$ is adjusted by time delay control data DTD.

The first and second passive correlators 130 and 210 are implemented with passive electrical elements capable of coding or decoding signals and performing correlation thereof, such as a Film Bulk Acoustic Resonator (FBAR), an FBAR filter and a matched SAW filter.

The embodiment of the present invention employing the first and second passive correlators 130 and 210 implemented with a matched SAW filter is described in detail below.

Figure 3:
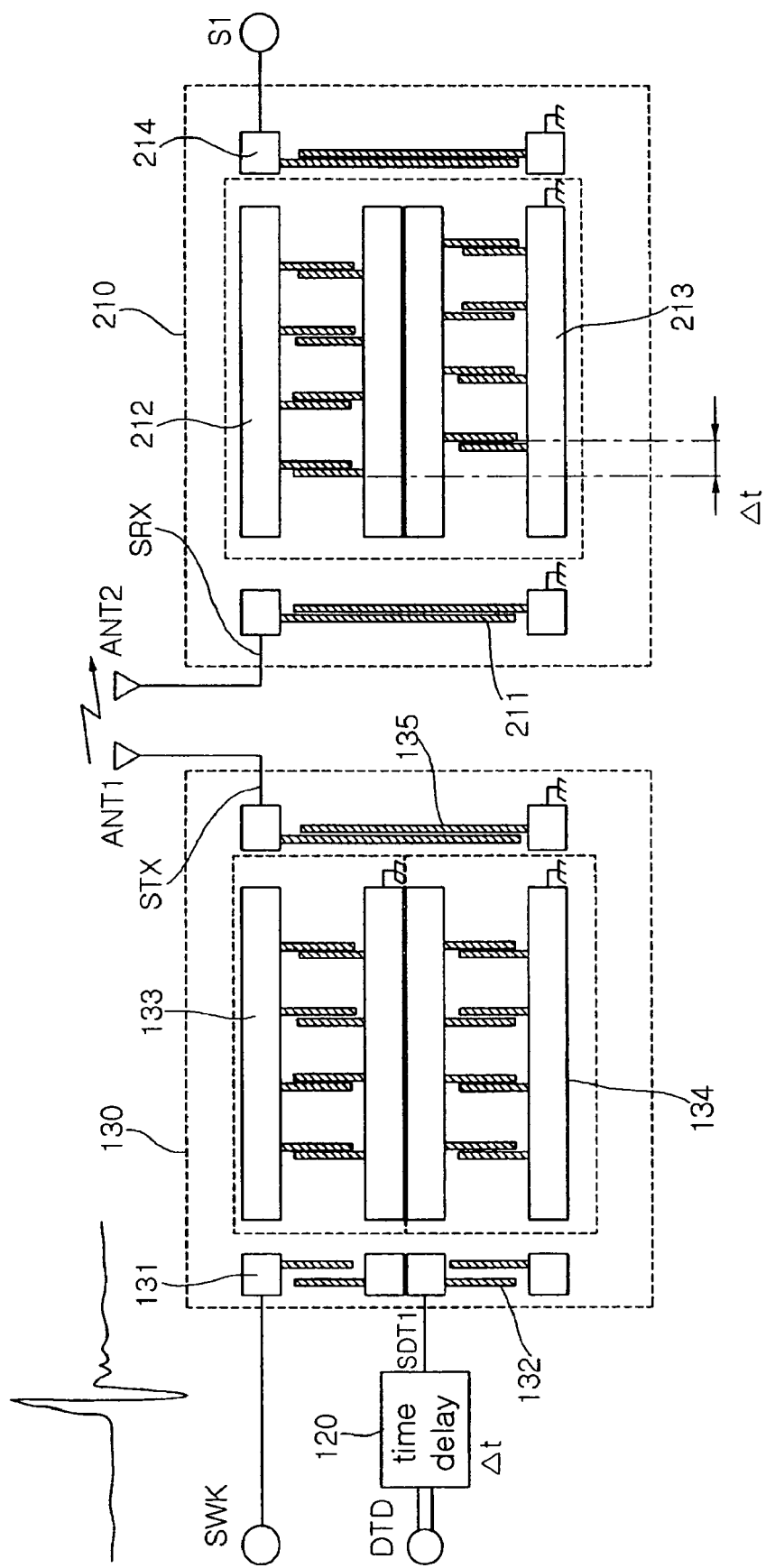
FIG. 3 is a partially enlarged construction view illustrating first and second passive correlators in a wake-up system according to the present invention.
Figure 4:
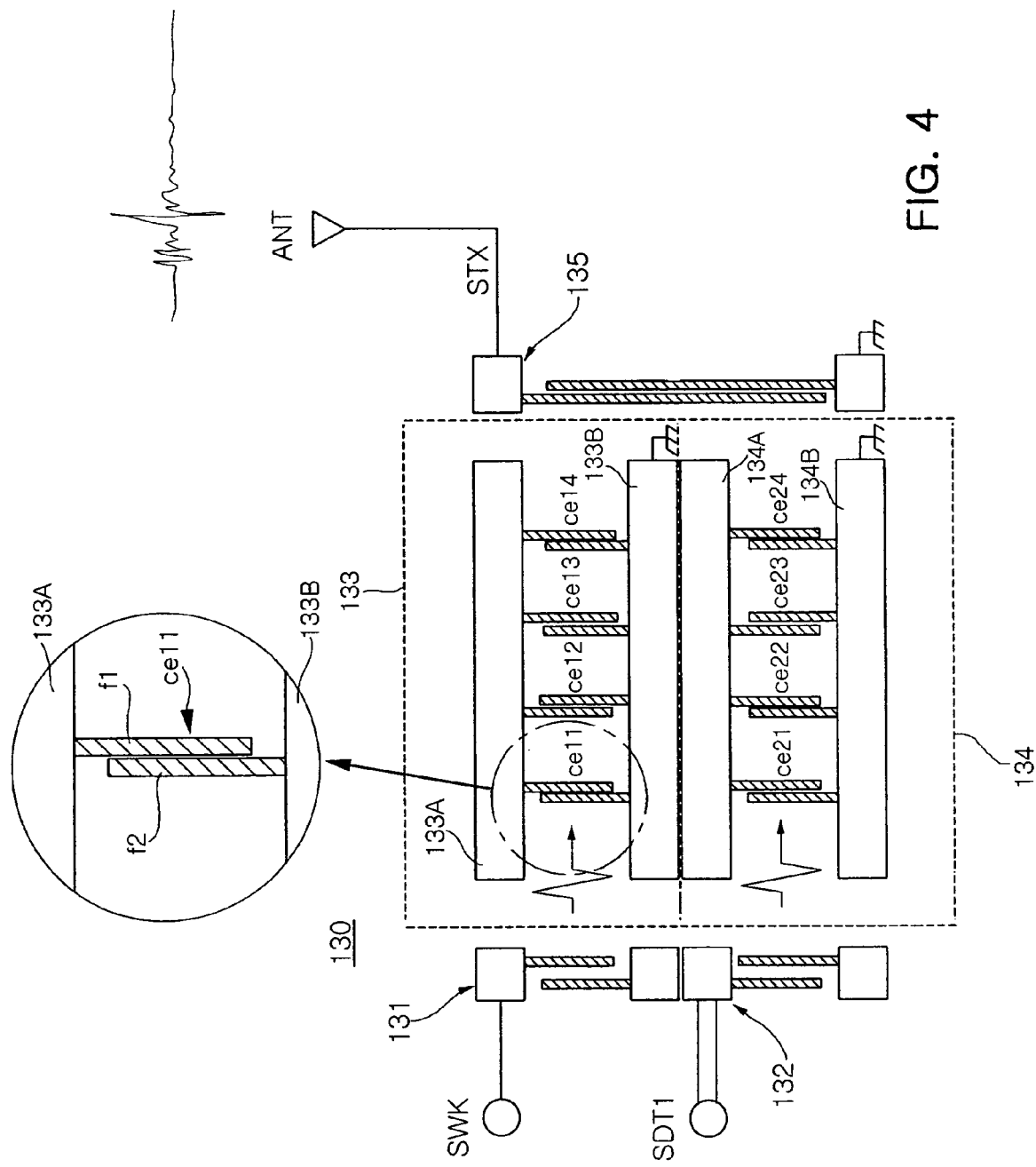
FIG. 4 is a construction view illustrating a first passive correlator according to the present invention.

FIG. 3 is a partially enlarged construction view illustrating first and second passive correlators in a wake-up system according to the present invention and FIG. 4 is a construction view illustrating a first passive correlator according to the present invention.

Referring to FIGS. 2 to 4, the first passive correlator 130 comprises a matched SAW filter formed on a piezoelectric plate. Here, the matched SAW filter includes a first SAW input electrode unit 131 for converting the wake-up signals SWK from the wake-up signal generation unit 110 into first SAW signals, a second SAW input electrode unit 132 for converting the first delayed signals SDT1 from the time delay unit 120 into second SAW signals, a first coding electrode unit 133 for correlating and coding the first SAW signals, a second coding electrode unit 134 for correlating and coding the second SAW signals and a SAW output electrode unit 135 for synthesizing the SAW signals coded by the first coding electrode unit and the SAW signals coded by the second coding electrode unit and converting the result of the synthesizing into electrical signals to be outputted to the transmission antenna.

The first coding electrode unit 133 includes a first electrode 133A formed in a conductive linear pattern on the piezoelectric plate, a second electrode 133B formed in a conductive pattern, the second electrode 133B being spaced from the first electrode 133A by a predetermined interval and parallel to the first electrode 133A and a plurality of first coding electrodes ce11~ce14. Here, the plurality of first coding electrodes ce11~ce14 includes a plurality of first electrode fingers formed in a conductive pattern formed in the direction of the second electrode 133B, the plurality of first electrode fingers are connected to the first electrode 133A and a plurality of second electrode fingers formed in a conductive pattern formed in the direction of the first electrode 133A, the plurality of second electrode fingers are connected to the second electrode 133B. Here, the first and second electrode fingers 133A and 133B are interdigitated to form the teeth of a comb structure. Also, the first and second electrode fingers 133A and 133B are corresponded, respectively, to form a pair.

The second coding electrode unit 134 includes a first electrode 134A formed in a conductive linear pattern on the piezoelectric plate, a second electrode 134B formed in a conductive pattern, the second electrode 134B being spaced from the first electrode 134A by a predetermined interval and parallel to the first electrode 134A and a plurality of second coding electrodes ce21~ce24. Here, the plurality of second coding electrodes ce21~ce24 includes a plurality of first electrode fingers formed in a conductive pattern formed in the direction of the second electrode 134B, the plurality of first electrode fingers are connected to the first electrode 134A and a plurality of second electrode fingers formed in a conductive pattern formed in the direction of the first electrode 134A, the plurality of second electrode fingers are connected to the second electrode 134B. Here, the first and second electrode fingers are interdigitated to form the teeth of a comb structure. Also, the first and second electrode fingers are corresponded, respectively, to form a pair.

Figure 5:
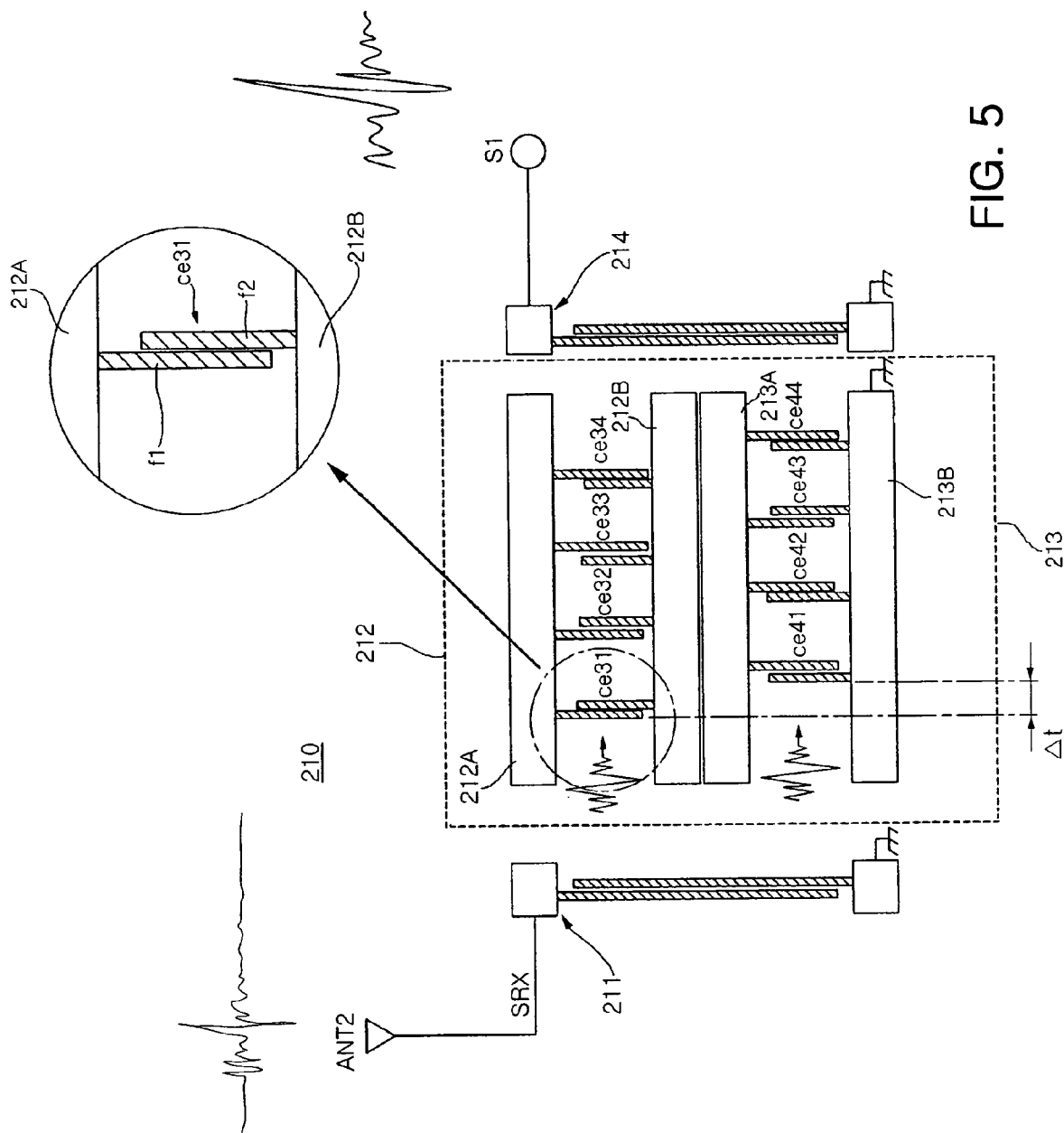
FIG. 5 is a construction view illustrating a second passive correlator according to the present invention.

FIG. 5 is a construction view illustrating a second passive correlator according to the present invention.

Referring to FIGS. 2 to 5, the second passive correlator 210 comprises a matched SAW filter formed on a piezoelectric plate. Here, the matched SAW filter includes a SAW input electrode unit 211 for converting the received signals received by the reception antenna ANT2 into SAW signals, a first decoding electrode unit 212 for correlating the SAW signals from the SAW signal input electrode unit in the same fashion as the first coding electrode unit and decoding the correlation result, a second decoding electrode unit 213 for delaying the SAW signals from the SAW signal input electrode unit by a predetermined delay time $\Delta t$, correlating the delayed SAW signals in the same fashion as the second coding electrode unit and decoding the correlation result and a SAW output electrode unit 214 for synthesizing the SAW signals decoded by the first decoding electrode unit 212 and the SAW signals decoded by the second decoding electrode unit 213 and converting the synthesizing result into electrical signals to be outputted thereto.

Here, the first decoding electrode unit 212 includes a first electrode 212A formed in a conductive linear pattern on the piezoelectric plate, a second electrode 212B formed in a conductive pattern, the second electrode 212B being spaced from the first electrode 212A by a predetermined interval and parallel to the first electrode 212A and a plurality of first decoding electrodes ce31~ce34. Here, the plurality of first decoding electrodes ce31~ce34 includes a plurality of first electrode fingers formed in a conductive pattern formed in the direction of the second electrode 212B, the plurality of first electrode fingers being connected to the first electrode 212A and a plurality of second electrode fingers formed in a conductive pattern formed in the direction of the first electrode, the plurality of second electrode fingers being connected to the second electrode 212B. Here, the first and second electrode fingers are interdigitated to form the teeth of a comb structure. Also, the first and second electrode fingers are corresponded, respectively, to form a pair.

The second decoding electrode unit 213 includes a first electrode 213A formed in a conductive linear pattern on the piezoelectric plate, a second electrode 213B formed in a conductive pattern, the second electrode 213B being spaced from the first electrode 213A by a predetermined interval and parallel to the first electrode 213A and a plurality of second decoding electrodes ce41~ce44. The plurality of second decoding electrodes ce41~ce44 includes a plurality of first electrode fingers formed in a conductive pattern formed in the direction of the second electrode 213B, the plurality of first electrode fingers being connected to the first electrode 213A and a plurality of second electrode fingers formed in a conductive pattern formed in the direction of the first electrode 213A, the plurality of second electrode fingers being connected to the second electrode 213B. Here, the first and second electrode fingers are interdigitated to form the teeth of a comb structure. Also, the first and second electrode fingers are corresponded, respectively, to form a pair, in which each electrode finger pair is shifted from each electrode finger pair of the first decoding electrode unit 212 by a distance corresponding to the predetermined delay time $\Delta t$.

FIGS. 6a and 6b are waveforms of wake-up signals according to the present invention. More specifically, FIG. 6a is a waveform of a wake-up signal in a spectrum domain and FIG. 6b is a waveform of a wake-up signal in a time domain.

Figure 7:
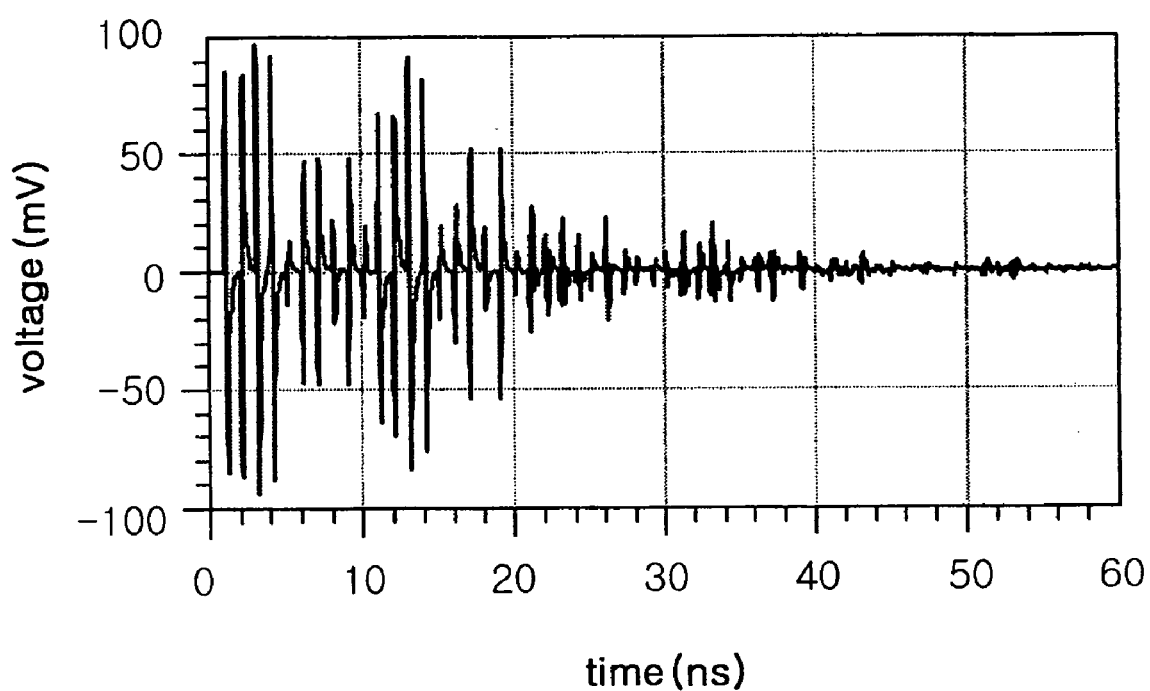
FIG. 7 is a waveform of coded transmitting signals according to the present invention.

FIG. 7 is a waveform of coded transmitting signals according to the present invention. Namely, the transmitting signals STX are coded by a first passive correlator 130.

Figure 8:
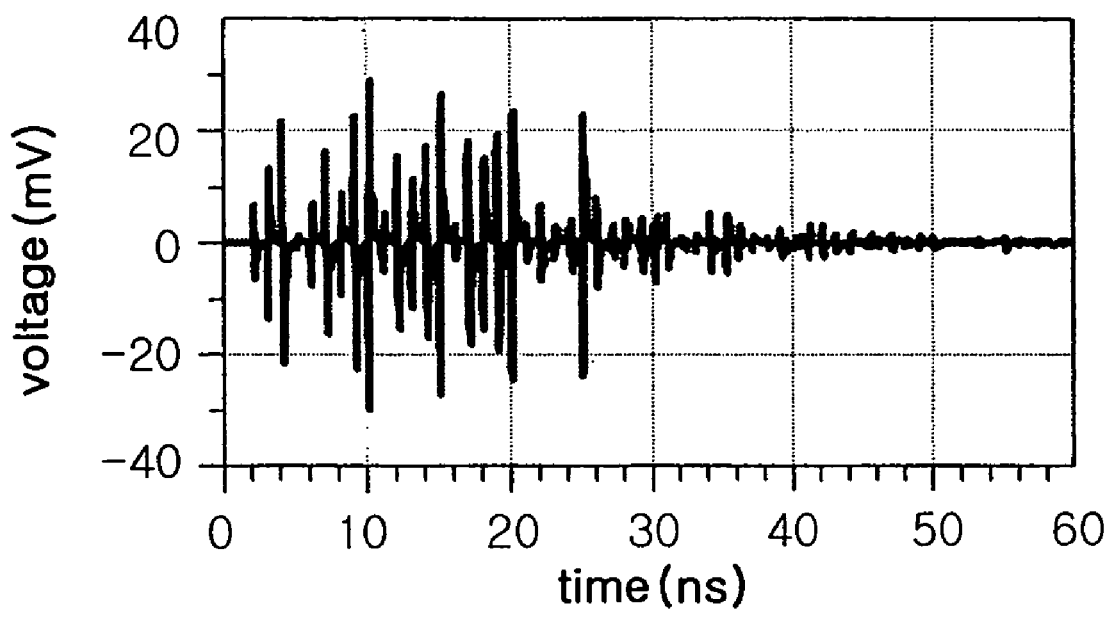
FIGS. 8a and 8b are waveforms of decoded received signals according to the present invention.
Figure 8:
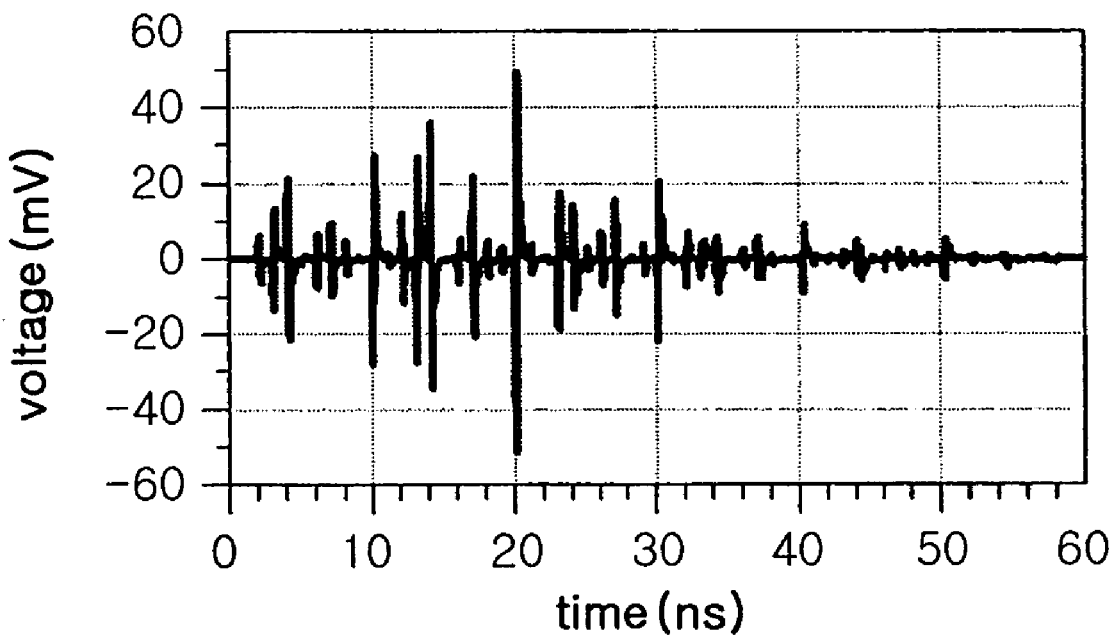

FIGS. 8a and 8b are waveforms of decoded receive signals according to the present invention, in which the received signals are decoded by the second passive correlator 210. More specifically, FIG. 8a is a waveform of a decoded received signal when the first and second passive correlators 130 an 210 are mismatched, and FIG. 8b is a waveform of a decoded received signal when the first and second passive correlators 130 and 210 are matched.

Figure 9:
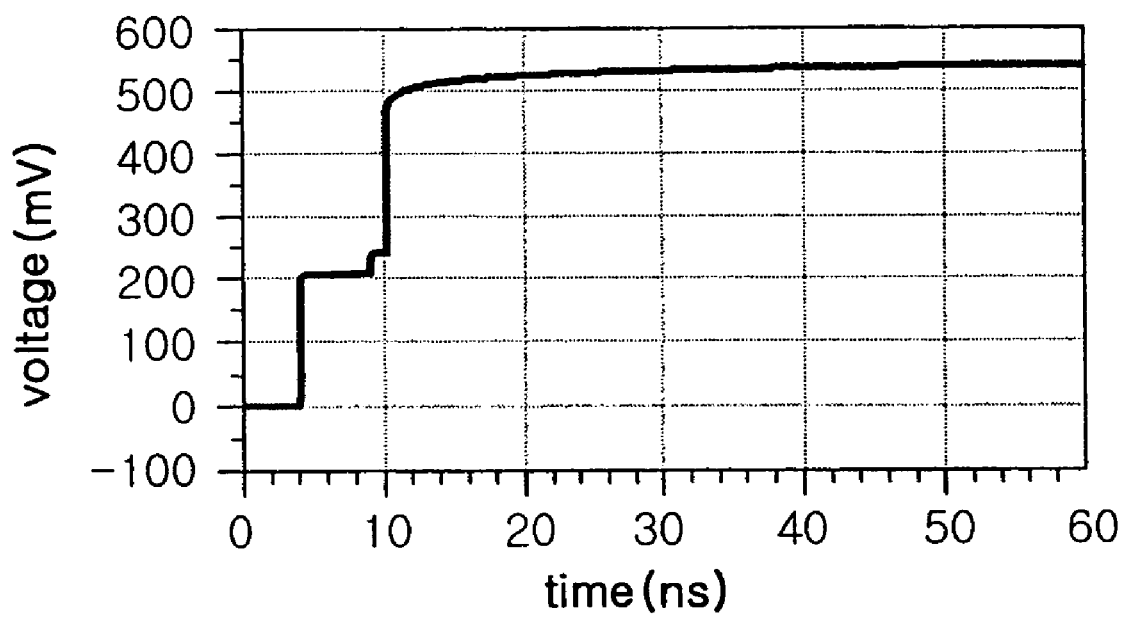
FIGS. 9a and 9b are waveforms of a DC switching voltage transformed from wake-up received signals according to the present invention.
Figure 9:
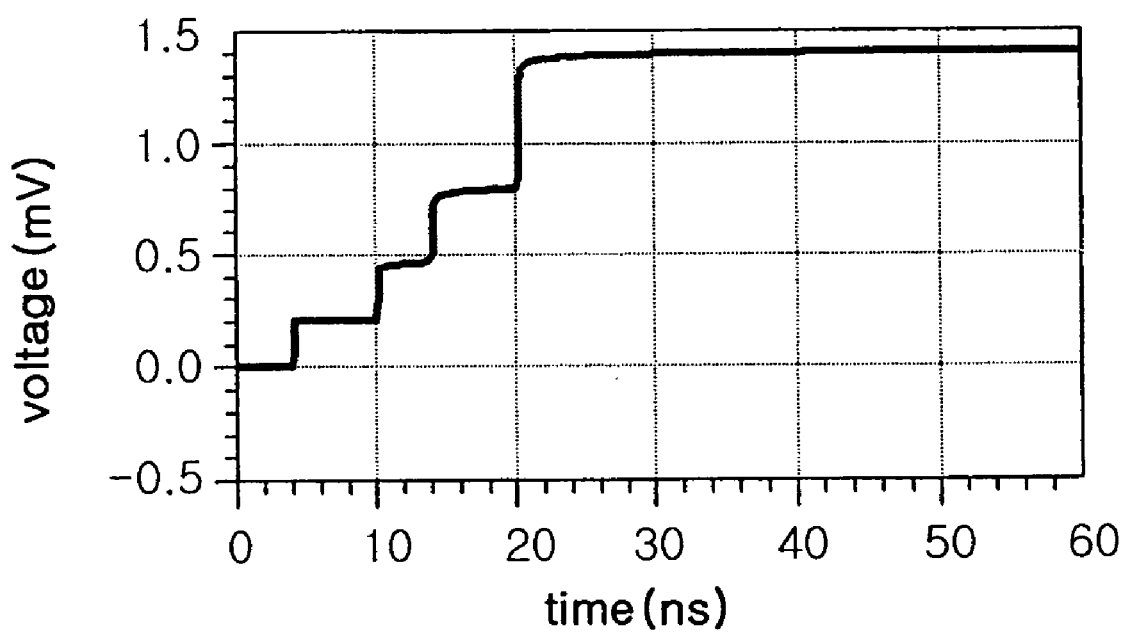

FIGS. 9a and 9b are waveforms of a DC switching voltage transformed from wake-up received signals according to the present invention. More specifically, FIG. 9a is a waveform of a DC switching voltage when the first and second passive correlators 130 and 210 are mismatched, and FIG. 9b is a waveform of a DC switching voltage when the first and second passive correlators 130 and 210 and are matched.

The operations and effects of the present invention are described in detail as follows with reference to the drawings.

Figure 6:
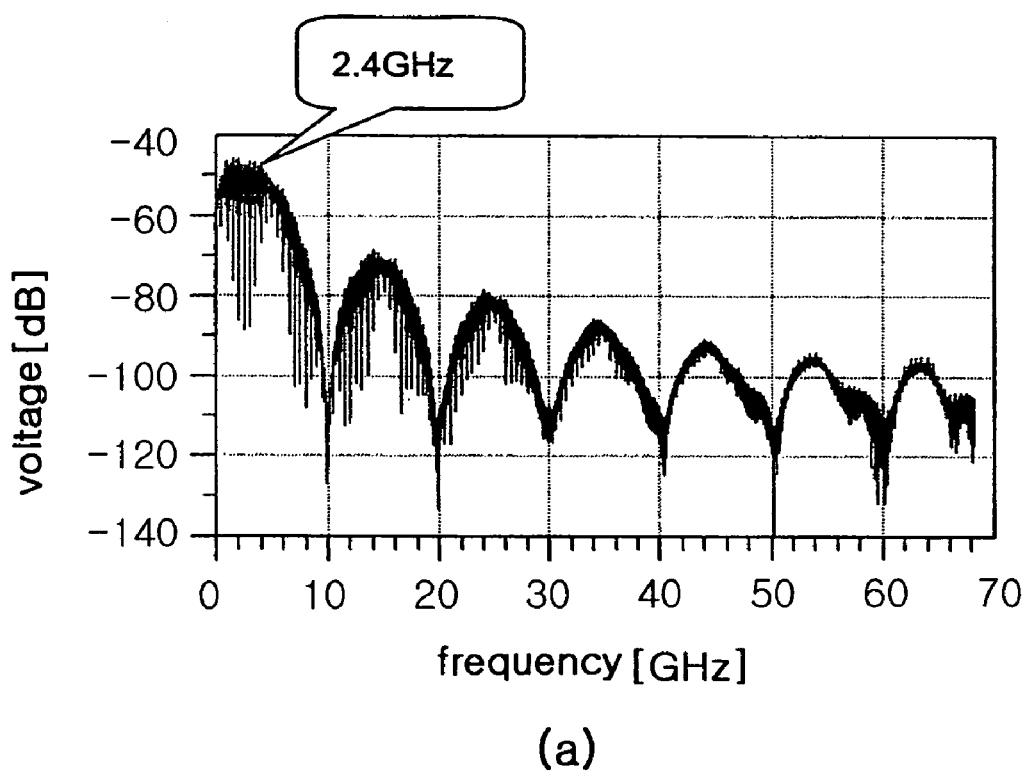
FIGS. 6a and 6b are waveforms of wake-up signals according to the present invention.
Figure 6:
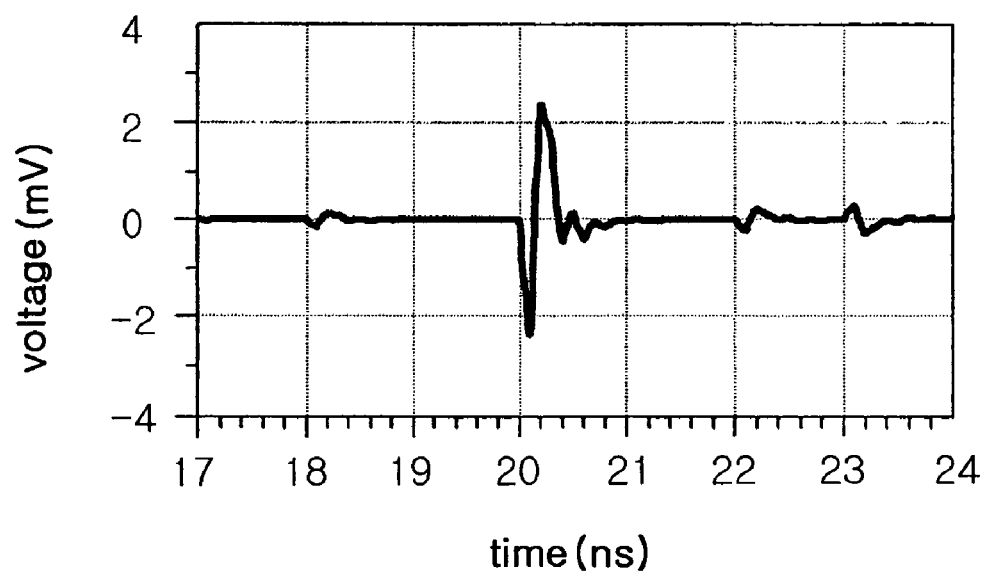

Referring to FIGS. 2 to 9, wake-up signals SWK as shown in FIGS. 6a and 6b are generated in the wake-up signal generation unit 110 of the transmitter. Also, the wake-up signals SWK may be generated in the wake-up signal generation unit 110 according to user selection. Here, the wake-up signal SWK may be a signal pulse signal of pulse train having a plurality of pulses.

Also, the signal generation unit 111 of the wake-up signal generation unit 110 produces wake-up signals whose power is amplified by the power amplifier 112 for transmission.

After that, the time delay unit 120 delays the wake-up signals from the wake-up signal generation unit 110 by a predetermined delay time $\Delta t$. Here, the time delay unit 120 controls the predetermined delay time $\Delta t$ based on time delay control data DTD.

Through such control of the delay time Δt, one of the plurality of devices to be awakened can be selected, in which the plurality of devices differently set their delay times. One of the plurality of devices to be controlled can be selected as the receiver having the same as the delay time of the transmitter responds to the wake-up signals.

After that, in the first passive correlator 130 the respective wake-up signals and the respective first delayed signals are correlated and then coded. After that, the coded signals are synthesized for transmission. The transmitting signals STX from the synthesizing, as shown in FIG. 7, are wirelessly transmitted to the air through the transmission antenna ANT1.

Now, wake-up operations of the receiver receiving wake-up signals transmitted from the transmitter are described in detail below.

Firstly, when the transmitter transmits signals as transmitting signals STX to the air through the transmission antenna ANT1, the receiver receives transmitted signals as receive signals SRX through the reception antenna ANT2. The second passive correlator 210 delays the receive signals SRX by a predetermined delay time Δt to generate second delay signals SDT2. The respective second delay signals SDT2 and the respective receive signals SRX are correlated in the same fashion as the first passive correlator 130 and the correlation results are decoded to generate decoded signals. The decoded signals are synthesized to generate signals as shown in FIGS. 8a and 8b.

After that, the signal amplifying unit 220 amplifies the signals synthesized by the second passive correlator 210 based on a preset gain. The gain of the signal amplifying unit 220 is determined depending on environments to which the wake-up system of the present invention is applied, such as transmission power of wake-up signals, receiving level of wake-up signals, switching characteristics of a switching unit, etc.

After that, the AC/DC converting unit 230 converts the output signals from the amplifying unit 220 into a DC switching voltage VSW as shown in FIG. 9b, which is supplied to a switching unit 240.

The DC switching voltage as shown in FIG. 9a is generated when the transmitter and the receiver are mismatched. When mismatched, the DC switching voltage is approximately 0.55V, which is insufficient to activate the switching unit 240. On the other hand, the DC switching voltage as shown in FIG. 9b is generated when the transmitter and the receiver are matched. When matching, the DC switching voltage is approximately 1.4V, which is sufficient to activate the switching unit 240.

The switching unit 240 performs switching operations for power supply according to the DC switching voltages.

While wake-up signals are transmitted from the transmitter, the receiver performing the correlation operation in the same fashion as the transmitter is awakened in response to the wake-up signals. On the other hand, if the receiver performs its correlation operation differently from the transmitter, since it does not respond to the wake-up signals from the transmitter, it cannot be awakened.

With reference to FIGS. 3 and 4, the first passive correlator 130 is described in detail below.

In the first passive correlator 130, the wake-up signals SWK from the wake-up signal generation unit 110 are converted into first SAW signals by a first SAW input electrode 131. The first delay signals SDT1 from the time delay unit 120 are converted into second SAW signals by a second SAW input electrode 132.

The first and second coding electrode units 133 and 134 correlate and code the first and second SAW signals, respectively.

After that, the SAW signals from the first and second coding electrode units 133 and 134 are synthesized by the SAW output electrode unit 135, and then converted into electrical signals to be outputted through the transmission antenna ANT1.

The coding procedure of the first passive correlator 130 is described below. Signals inputted to the first passive correlator 130 are coded according to the structure of a matched SAW filter. The coding operation is differently performed in a plurality of electrode pairs included in code electrodes of the first code electrode unit 133. Namely, the coding operation is performed according to alignment sequences of a plurality of first and second electrode fingers f1 and f2. Here, the plurality of first electrode fingers f1 are connected to the first electrode 133A and formed in a conductive pattern formed in the direction of the second electrode 133B, and the plurality of second electrode fingers f2 are connected to the second electrode 133B and formed in a conductive pattern formed in the direction of the first electrode 133A.

For example, if "1" is defined to mean that the second electrode fingers f2 are aligned with the first electrode fingers f1 and if "0" is defined to mean the opposite, the first coding electrode unit 133 of FIG. 4 performs coding operations such as "0, 1, 0, 0," and the second coding electrode unit 134 of FIG. 4 performs coding operations such as "0, 0, 1, 0."

With reference to FIGS. 3 and 5, the second passive correlator 210 is described in detail below.

In the second passive correlator 210, the signals received by the reception antenna ANT2 are converted into SAW signals in the SAW input electrode unit 211. The first decoding electrode 212 correlates the SAW signals in the same fashion as the first coding electrode unit and decodes the correlation result to generate decoded SAW signals. At the same time, the second decoding electrode 213 delays the SAW signals form the SAW signal input electrode unit 211 by a predetermined delay time Δt. After that, the second decoding electrode unit 213 correlates the delayed SAW signals in the same fashion as the second coding electrode unit 134 and decodes the correlation result to generate decoded SAW signals.

After that, the SAW signals from the first and second decoding electrode units 212 and 213 are synthesized by a SAW output electrode unit 214 and converted into electrical signals to be outputted thereto.

The coding procedure of the first passive correlator 210 is described below. Signals inputted to the second passive correlator 210 are decoded according to the structure of a matched SAW filter. The decoding operation is differently performed in a plurality of electrode pairs included in decode electrodes of the first decode electrode unit 212. Namely, the decoding operation is performed according to alignment sequence of a plurality of first and second electrode fingers f1 and f2. Here, the plurality of first electrode fingers f1 are connected to the first electrode 212A and formed in a conductive pattern formed in the direction of the second electrode 212B, and the plurality of second electrode fingers f2 are connected to the second electrode 212B and formed in a conductive pattern formed in the direction of the first electrode 212A.

For example, if "1" is defined to mean that the second electrode fingers f2 are aligned with the first electrode fingers f1 and if "0" is defined to mean the opposite, the first decoding electrode unit 212 of FIG. 5 performs decoding operations such as "0, 1, 0, 0," which is matched to the coding operation of the first coding electrode 133 in the first passive correlator 130. Under the same conditions, the second decoding electrode unit 213 of FIG. 5 performs decoding operations such as "0, 0, 1, 0," which is matched to the coding operation of the second coding electrode 134 in the first passive correlator 130.

As apparent from the above description, in the wake-up system of the present invention, since the decoding operation of the receiver is performed to match with the coding operations of the transmitter, the signals outputted from the second passive correlator 210 have relatively large magnitude, which is sufficient to perform switching operations. Such signals having a large magnitude are amplified and converted into DC switching voltage signals VSW to be inputted to the switching unit. Therefore, when the switching unit performs a switching operation based on the DC switching voltage signals VSW, the receiver is supplied with power and awakened.

Also, the wake-up system according to the present invention performs a wake-up operation at relatively low power, compared with the case when a correlator is not employed, such that, since the transmitter/receiver adopt the same correlator, the receiver can amplify magnitude of the wake-up signals transmitted from the transmitter and thusly, even though the amplification rate of an amplifier at the subsequent stage thereof is set to a relatively low value, voltage for a wake-up operation can be supplied to the receiver.

As mentioned above, in a wake-up system adopted to wireless transmission/reception devices such as remote controllers, mobile communication terminals, etc., the wake-up system with passive correlators according to the present invention can reduce consumption power for wake-up operations in a receiver such that correlation operations of correlators including passive electrical elements such as a matched filter etc. are performed at a transmitter and the receiver in the same fashion and wake-up signals are transformed into a signal for performing the wake-up operation in the receiver.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wake-up system with passive correlators comprising:
a) a transmitter, including:
a wake-up signal generation unit for generating wake-up signals;
a time delay unit for delaying the wake-up signals by a predetermined delay time ($\Delta t$) and generating first delayed signals based on a result of the delaying;
a first passive correlator for correlating and coding the respective wake-up signals and the respective first delayed signals and synthesizing the coded signals; and
a transmission antenna for wirelessly transmitting signals synthesized by the first passive correlator to the air; and
b) a receiver, including:
a reception antenna for receiving signals transmitted by the transmission antenna;
a second passive correlator for delaying the signals received by the reception antenna by a predetermined delay time ($\Delta t$), generating second delayed signals based on a result of the delaying, correlating the respective received signals and the respective second delayed signals in the same fashion as the first passive correlator, decoding the correlation result and synthesizing the decoded signals;
a signal amplifying unit for amplifying the signals synthesized by the second passive correlator based on a preset gain;
an AC/DC converting unit for converting the output signals from the amplifying unit into DC switching voltage; and
a switching unit for performing an ON/OFF switching operation according to the DC switching voltage to output a wake-up voltage therefrom to the receiver.

2. The system as set forth in claim 1, wherein the wake-up signal generation unit includes:
a signal generation unit for generating the wake-up signals; and
a power amplifier for amplifying power of the wake-up signals from the signal generation unit for transmission.

3. The system as set forth in claim 1, wherein the time delay unit is designed such that the predetermined delay time ($\Delta t$) is adjusted by time delay control data.

4. The system as set forth in claim 3, wherein the first passive correlator comprises a matched SAW filter formed on a piezoelectric plate, in which the matched SAW filter includes:
a first SAW input electrode unit for converting the wake-up signals into first SAW signals;
a second SAW input electrode unit for converting the first delayed signals into second SAW signals;
a first coding electrode unit for correlating and coding the first SAW signals;
a second coding electrode unit for correlating and coding the second SAW signals; and
a SAW output electrode unit for synthesizing the SAW signals coded by the first coding electrode unit and the SAW signals coded by the second coding electrode unit and converting the result of the synthesizing into electrical signals to be outputted to the transmission antenna.

5. The system as set forth in claim 1, wherein the second passive correlator comprises a matched SAW filter formed on a piezoelectric plate, in which the matched SAW filter includes:
a SAW input electrode unit for converting received signals received by the reception antenna into SAW signals;
a first decoding electrode unit for correlating the SAW signals from the SAW input electrode unit and decoding the correlation result;
a second decoding electrode unit for delaying the SAW signals from the SAW signal input electrode unit by a predetermined delay time ($\Delta t$), correlating the delayed SAW signals in the same fashion as the second coding electrode unit and decoding the correlation result; and
a SAW output electrode unit for synthesizing the SAW signals decoded by the first decoding electrode unit and the SAW signals decoded by the second decoding electrode unit and converting the synthesizing result into electrical signals to be outputted thereto.

6. The system as set forth in claim 4, wherein the first coding electrode unit includes:
a first electrode formed in a conductive linear pattern on the piezoelectric plate;
a second electrode formed in a conductive pattern, the second electrode being spaced from the first electrode by a predetermined interval and parallel to the first electrode; and
a plurality of first coding electrodes including:

a plurality of first electrode fingers formed in a conductive pattern formed in the direction of the second electrode, the plurality of first electrode fingers being connected to the first electrode; and a plurality of second electrode fingers formed in a conductive pattern formed in the direction of the first electrode, the plurality of second electrode fingers being connected to the second electrode, wherein the first and second electrode fingers are interdigitated to form the teeth of a comb structure, and the first and second electrode fingers are corresponded, respectively, to form a pair.

7. The system as set forth in claim 6, wherein the second coding electrode unit includes:

a first electrode formed in a conductive linear pattern on the piezoelectric plate;

a second electrode formed in a conductive pattern, the second electrode being spaced from the first electrode by a predetermined interval and parallel to the first electrode; and a plurality of second coding electrodes including:

a plurality of first electrode fingers formed in a conductive pattern formed in the direction of the second electrode, the plurality of first electrode fingers being connected to the first electrode; and a plurality of second electrode fingers formed in a conductive pattern formed in the direction of the first electrode, the plurality of second electrode fingers being connected to the second electrode, wherein the first and second electrode fingers are interdigitated to form the teeth of a comb structure, and the first and second electrode fingers are corresponded, respectively, to form a pair.

8. The system as set forth in claim 5, wherein the first decoding electrode unit includes:

a first electrode formed in a conductive linear pattern on the piezoelectric plate;

a second electrode formed in a conductive pattern, the second electrode being spaced from the first electrode by a predetermined interval and parallel to the first electrode; and a plurality of first decoding electrodes including:

a plurality of first electrode fingers formed in a conductive pattern formed in the direction of the second electrode, the plurality of first electrode fingers being connected to the first electrode; and a plurality of second electrode fingers formed in a conductive pattern formed in the direction of the first electrode, the plurality of second electrode fingers being connected to the second electrode, wherein the first and second electrode fingers are interdigitated to form the teeth of a comb structure, and the first and second electrode fingers are corresponded, respectively, to form a pair.

9. The system as set forth in claim 8, wherein the second decoding electrode unit includes:

a first electrode formed in a conductive linear pattern on the piezoelectric plate;

a second electrode formed in a conductive pattern, the second electrode being spaced from the first electrode by a predetermined interval and parallel to the first electrode; and a plurality of second decoding electrodes including:

a plurality of first electrode fingers formed in a conductive pattern formed in the direction of the second electrode, the plurality of first electrode fingers being connected to the first electrode; and a plurality of second electrode fingers formed in a conductive pattern formed in the direction of the first electrode, the plurality of second electrode fingers being connected to the second electrode, wherein the first and second electrode fingers are interdigitated to form the teeth of a comb structure, and the first and second electrode fingers are corresponded, respectively, to form a pair, in which each electrode finger pair is shifted from each electrode finger pair of the first decoding electrode unit by a distance corresponding to the predetermined delay time ($\Delta t$).

10. The system as set forth in claim 8, wherein the plurality of first decoding electrodes of the first decoding electrode unit are identically aligned like the plurality of first coding electrodes of the first coding electrode unit.

11. The system as set forth in claim 9, wherein the plurality of second decoding electrodes of the second decoding electrode unit are identically aligned like the plurality of second coding electrodes of the second coding electrode unit.

* * * * *